No. 636,877. Patented Nov. 14, 1899.
F. B. WERSEL, Jr.
TUFTING APPARATUS FOR UPHOLSTERERS.
(Application filed May 19, 1899.)
(No Model.)

Witnesses
Geo. Addleman
O. K. Wolff

Inventor
Frank B. Wersel Jr
by J. E. Lemon
Attorney

THE NORRIS PETERS CO., PHOTO-LITHO., WASHINGTON, D. C.

UNITED STATES PATENT OFFICE.

FRANK B. WERSEL, JR., OF CINCINNATI, OHIO.

TUFTING APPARATUS FOR UPHOLSTERERS.

SPECIFICATION forming part of Letters Patent No. 636,877, dated November 14, 1899.

Application filed May 19, 1899. Serial No. 717,424. (No model.)

*To all whom it may concern:*

Be it known that I, FRANK BERNARD WERSEL, Jr., a citizen of the United States, and a resident of Cincinnati, in the county of Hamilton and State of Ohio, have invented an Improvement in Tufting Apparatus for Upholsterers, of which the following is a specification.

My invention relates to tufting apparatus for upholsterers, and has for its object to provide a novel, convenient, and simple molding mechanism for forming tufts of any desired configuration and size without necessity for employing skilled labor and so that by means of adjustable cross-bars the shape and dimensions of the tufts can be varied to suit any kind of upholstering cushion-work required for couches, carriage seats and backs, chairs, and other articles of furniture.

The invention consists in features of construction and novel combinations of parts in upholstery apparatus, as hereinafter described and claimed.

In the following description reference is had to the accompanying drawings, in which—

Figures 1, 4:
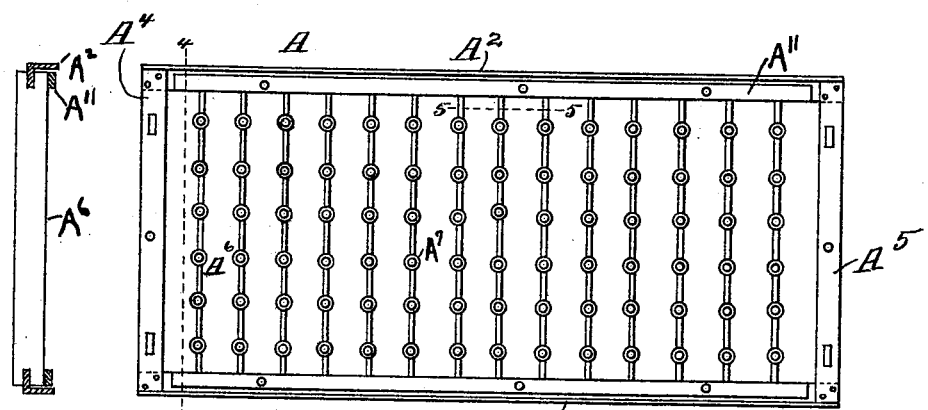
Figure 9:
Figure 8:
Figure 7:
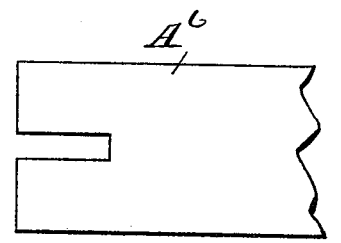
Figure 6:
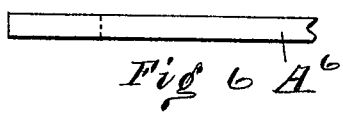
Figures 2, 3:
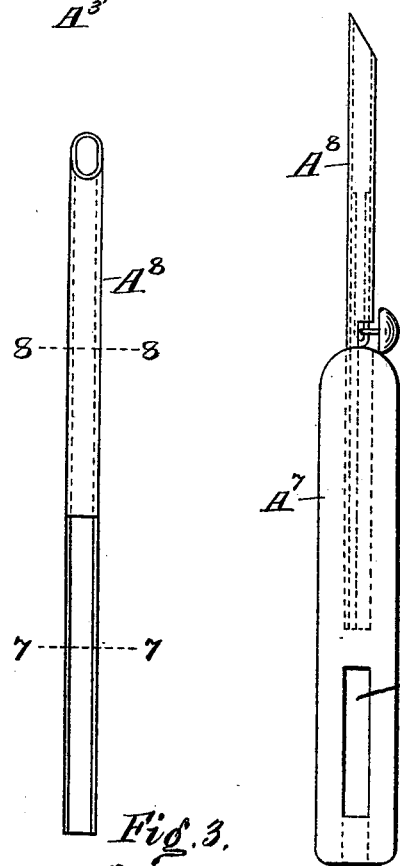
Figure 5:
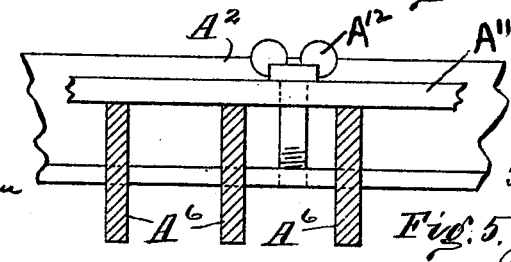

Figure 1 is a top view of my invention. Fig. 2 is a side elevation of tucking-tube and quill. Fig. 3 is a side elevation of quill. Fig. 4 is a section on line 4 4 of Fig. 1. Fig. 5 is a section on line 5 5 of Fig. 1. Fig. 6 is an edge view of Fig. 7. Fig. 7 is a side elevation of one end of the adjustable cross-bars. Fig. 8 is a section on line 7 7 of Fig. 3. Fig. 9 is a section on line 8 8 of Fig. 3.

The apparatus comprises a frame A, the sides of which are made of angle-irons $A^2$ and $A^3$, united at their ends by two cross-bars $A^4$ $A^5$. Extending from $A^2$ to $A^3$ are movable cross-bars $A^6$, so arranged as to be slid along the angle-irons $A^2$ and $A^3$ to any position desirable. Placed on the movable cross-bars are adjustable tucking-tubes $A^7$. The tucking-tube is provided with a small hole extending down from the center of the top to a suitable depth to receive a quill $A^8$. The quill $A^8$ is a hollow tube having its upper end pointed, so as to readily penetrate the goods, while the lower portion is partially cut away, as shown in Fig. 3, so that a button-fastener can be inserted and a button hung to one side and still allow a portion of the quill to be placed in the tucking-tube, as shown in Fig. 2. The adjustable tucking-tubes $A^7$ are provided with a transverse slot $A^9$. The adjustable cross-bar $A^6$ passes through this slot. The adjustable tucking-tubes $A^7$ can be slid along the adjustable cross-bar $A^6$ to any position desired, where it can be secured and held in that position by screwing up the set-screw $A^{10}$, which projects below the slot $A^9$. The adjustable cross-bars $A^6$ have longitudinal strips $A^{11}$ lying on top of them at each end, and passing through the strips $A^{11}$ are thumb-screws $A^{12}$, which screw into the angle sides $A^2$ and $A^3$. When the cross-bars are adjusted to suit the class of work which the operator desires to do, the thumb-screws $A^2$ are screwed down, holding the cross-bars in that position until it is desirable to change them. In Fig. 1 the thumb-screws are not shown.

The movable cross-bars $A^6$ and adjustable tucking-tubes $A^7$ are for the purpose of forming the tufts of any upholstery cushion or pad in any shape and size desired.

In using this upholstering apparatus the movable cross-bars and adjustable tucking-tubes are set to suit the sized tufts desired, when the quills, with a button-fastener and button in it, are placed in the tucking-tubes. A piece of leather or other material which has been previously marked off for the class of work desired is placed over the tucking-tubes, the quills passing through the leather at the points where the buttons are to be placed. Filling guard-fingers are now placed over the quills. The filling is placed in the spaces between the filling guard-fingers to the desired depth, when the filling guard-fingers are removed. The backing is placed over the filling and pressed down tightly until the backing is resting on the tucking-tubes, the quills projecting above. The quills are pulled through the backing, leaving the wire button-fastener standing up through the backing. An ordinary metal back is placed over the wire, fastening the wires bent down, securing the button.

What I claim as my invention is—

1. In an upholstering apparatus, the combination with a frame A adjustable cross-bars $A^6$ with adjustable tucking-tubes $A^7$, which surround the sliding cross-bars $A^6$, substantially as described.

2. In an upholstering apparatus, the combination with a frame A adjustable cross-bars $A^6$, adjustable tucking-tubes $A^7$, which surround the sliding cross-bars $A^6$, the tucking-tubes $A^7$ having a vertical hole, the quill $A^8$ therein, substantially as described.

3. In an upholstering apparatus, the combination with a frame A adjustable cross-bars $A^6$, adjustable tucking-tubes $A^7$, which surround the sliding cross-bars, the tucking-tubes $A^7$ having vertical holes, the quill $A^8$ therein, the lower part of quill $A^8$ being cut away to receive a button-fastener, substantially as described.

4. In an upholstering apparatus, the combination with a frame A, adjustable cross-bars $A^6$ slotted at the end, longitudinal strips $A^{11}$ on top of the ends of the cross-bars $A^6$ provided with thumb-screws $A^{12}$, adjustable tucking-tubes $A^7$ surrounding the cross-bars $A^6$, and provided with set-screws $A^{10}$, the tucking-tube $A^7$ having a vertical hole, the quill $A^8$ therein having its lower part slit up from the bottom and open on the side to receive a button-fastener, substantially as described.

FRANK B. WERSEL, JR.

Witnesses:
EDMOND A. SANAU,
GEORGE N. WERSEL.